United States Patent [19]

Hirvonen

[11] Patent Number: 4,547,134
[45] Date of Patent: Oct. 15, 1985

[54] DOSING DEVICE

[76] Inventor: Erkki A. Hirvonen, Salmintie 8 B 10, SF-71800 Siilinjärvi, Finland

[21] Appl. No.: 449,881

[22] Filed: Dec. 16, 1982

[30] Foreign Application Priority Data

Jan. 6, 1982 [FI] Finland ............................. 820026

[51] Int. Cl.⁴ .................. F04B 17/00; F04B 35/00
[52] U.S. Cl. .................................... 417/349; 417/392
[58] Field of Search .............. 417/12, 349, 392, 403; 91/275; 60/376, 377

[56] References Cited

U.S. PATENT DOCUMENTS

| 3,344,667 | 10/1967 | Maltby | 91/275 |
| 4,119,113 | 10/1978 | Meginniss | 417/397 |
| 4,176,586 | 12/1979 | Stoll | 91/275 |

FOREIGN PATENT DOCUMENTS

| 1221028 | 7/1966 | Fed. Rep. of Germany | 91/275 |
| WO80/00867 | 5/1980 | PCT Int'l Appl. | 91/275 |
| 1212214 | 11/1970 | United Kingdom . | |
| 2062124 | 5/1981 | United Kingdom | 91/275 |

Primary Examiner—Leonard E. Smith
Assistant Examiner—Jane E. Obee
Attorney, Agent, or Firm—Biebel, French & Nauman

[57] ABSTRACT

The invention relates to a device for dosing or for pumping in a controlled manner a liquid or slurry, a device having a piston freely reciprocating in a cylinder; members connected to the cylinder on the opposite sides of the path of the piston movement for feeding the liquid or slurry under pressure into the cylinder in order to move the piston or for discharging liquid or slurry from the cylinder by means of the pressure of the liquid or slurry directed into the cylinder to the opposite side of the piston, when the piston returns; a valve member in the feed and discharge members of the liquid or slurry for their alternate opening and closing; switches fitted at the ends of the cylinder for sensing the position of the piston; and a control unit for controlling the stroke frequency of the piston, and thereby the volume flow of the liquid or slurry, and for transmitting the signal given by the switch to the valve member in order to open and close it at different positions of the piston. According to the invention, the control unit has been fitted to adjust the time interval between the starts of the piston movement. Thus the stroke frequency of the piston and the volume flow of the liquid or slurry remain constant in spite of variations in the feed pressure and viscosity of the liquid or slurry.

3 Claims, 2 Drawing Figures

DOSING DEVICE

BACKGROUND OF THE INVENTION

The present invention relates to a device for dosing a liquid or a slurry or for pumping it in a controlled manner.

Swedish Patent Specification No. 373,206 discloses a device for dosing liquids, a device in which a piston in a cylinder is reciprocated by the force of the pressure of the liquid. A separate valve mechanism controls the valves at the ends of the cylinder in such a manner that the pressure of the liquid to be fed moves the piston alternately in different directions and presses the liquid ahead of it to the dosing point. The arrival of the piston at one end of the cylinder is indicated by means of, for example, an inductive switch. At this time the valve mechanism shifts the pressurized feed flow to the other end of the cylinder, and the piston starts off in the opposite direction, simultaneously forcing the liquid ahead of it through the valve mechanism to the feeding point.

In the above device the liquid feed rate depends on the feed pressure of the liquid and on the viscosity of the liquid. When the feed pressure increases or the viscosity decreases, for example owing to a change in the temperature, the liquid flow rate in the pipe system increases and, likewise, the dosing rate increases. In addition, the dosing rate must be adjusted by adjusting the feed pressure, a procedure which requires complicated equipment.

Swedish Patent Specification No. 380,347 discloses a device of corresponding type for dosing liquids. Compared with the previous patent, this device has, additionally, separate clockwise mechanisms in series with the switches which indicate the position of the piston. Thus, when the piston arrives at one end of the cylinder, the clockwise mechanism delays the shift of the state of the valve mechanism by a predetermined length of time. Thus the piston waits at the end of the cylinder for a predetermined length of time before a new movement. The average dosing rate of the device can be adjusted by adjusting the waiting time.

In the device described above, changes in the feed pressure and viscosity of the liquid produce a change in the dosing rate. The device regulates only the waiting time of the piston at the ends of the cylinder. When the feed pressure or the liquid viscosity changes, the velocity of the piston changes, and thus there is a change in the length of one cycle of the device, i.e. the sum of the time consumed for the movement of the piston from one end of the cylinder to the other and the waiting time. This further changes the average feed rate of the device.

Finnish Patent Specification No. 31 300 discloses a device of a corresponding type for dosing liquid, a device in which a signal for the reciprocating movement of the piston is given by means of an external impulse. When the piston reaches the end of the cylinder, the pressure of the liquid shifts the valve mechanism in such a way that the piston moves back to the initial position, in which the piston remains waiting for the new feed impulse.

The device described above does not indicate at all how completely the piston has time to make a full feeding movement during one cycle. In the event that, owing to a decrease in the liquid feed pressure or an increase in the liquid viscosity, the liquid flow is slowed down and the piston does not have the time to complete the movement before a new feed impulse, a change in the average feed rate is produced without the device itself being capable of detecting or indicating it.

The object of the present invention is to provide a completely automatic, precise and rapid-acting device, operating by means of the pressure of the liquid or slurry for dosing or for pumping in a controlled manner a liquid or slurry. The present invention thus relates to a device of the above-mentioned type, having a piston which reciprocates freely in the cylinder; members connected to the cylinder on the opposite sides of the path of the piston movement, for feeding the liquid or slurry, under pressure, into the cylinder in order to move the piston, and for discharging, when the piston returns, the liquid or slurry from the cylinder by means of the pressure of the liquid or slurry directed into the cylinder to the opposite side of the piston; valve members in the liquid or slurry feed and discharge members, for their alternate opening and closing; switches sensing the piston position, fitted at the ends of the cylinder; and a control unit for adjusting the piston stroke frequency and thereby the volume flow of the liquid or slurry and for transmitting the signals given by the switches to the valve members in order to open and close them at different positions of the piston.

SUMMARY OF THE INVENTION

Contrary to the above-mentioned devices, in the device according to the invention the control unit has been fitted to control the time interval between the starts of the piston movement. The control unit is preferably a clockwork mechanism or an external impulse, for example a time relay.

Simultaneously with the starting of the movement of the piston, the state of action of the valve members is determined by signals received from the switches and the control unit. According to one embodiment of the invention, the control unit gives an error signal if the piston has not within the predetermined time interval moved from one end of the cylinder to the other.

In the device according to the invention, the piston stroke frequency, and thereby the volume flow of the liquid or slurry, remains constant in spite of variation in the feed pressure and viscosity of the liquid or slurry. Consequently, it can be used for dosing liquids or slurries more precisely, more rapidly and more reliably than previously. Furthermore, the device according to the invention is of simple construction and easy to service.

The switches sensing the piston position are preferably inductive switches, in which case the piston is at least partly of some inductively detectable material, such as refined iron. The valve members, for their part, can be three-way valves fitted in the feed and discharge members or one common four-way valve.

In practice the same liquid often has to be dosed to several different feeding points. When the device according to the invention is used, only one liquid pump is required for feeding the liquid. The dosing does not require an additional source of power. When the pressure of the feed line is above 100 kPa, a piston having a diameter of 20–30 mm already operates well, and the velocity of its movement in the cylinder is several centimeters per second. In this case the feed rate reaches several liters per minute.

In the practical embodiments of the invention, the cylinder can be detached manually, without auxiliary equipment. Thus the cylinder can, for example in case of damage, be replaced rapidly, or it can be replaced with a cylinder of a different volume when the required amount of chemicals changes substantially.

The device can thus operate within a wide operating range without a detrimental effect on its precision.

The device according to the invention can easily be applied in such a manner that the control from the time relay is replaced with, for example, control from a computer. In such a case the movement is also monitored continuously at the ends of the cylinder, and so any operational disturbances can be detected by means of alarm circuits.

DESCRIPTION OF THE PREFERRED EMBODIMENTS

Figure 1:
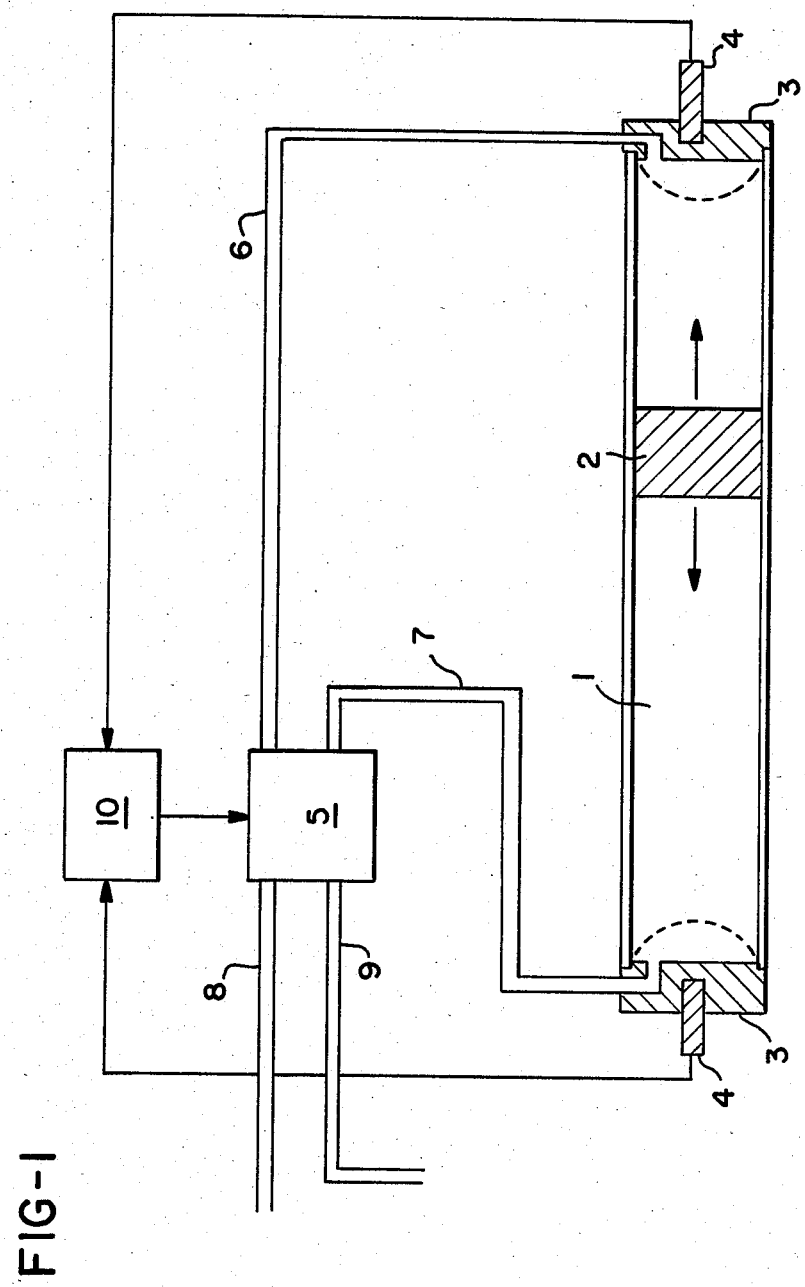
FIG. 1 illustrates a cross sectional schematic side elevation of a preferred embodiment of the invention.

In one embodiment of the invention, depicted in FIG. 1, the device consists of a cylinder 1 and a piston 2 reciprocating inside it. Switches 4, which sense the piston, are installed in the ends of the cylinder. The switches 4 can, for example, operate according to the induction principle, in which case at least part of the piston 2 is made of a material such as refined iron which enables the piston 2 to be sensed inductively. The valve mechanism 5 is connected to the ends of the cylinder by means of pipes 6 and 7. The valve mechanism consists of a four-way valve, and the valves can be, for example, electromagnetic valves. The liquid to be fed determines the materials of the device.

The position of the valves 5 is determined by means of signals from the switches 4 in the ends 3 of the cylinder 1 and, for example, from a time relay 10. The cylinder 1 is dimensioned on the basis of the maximum feed rate required. The feed rate is adjusted by changing the stroke frequency of the piston 2 by means of the time relay 10. The invention is not, however, limited to the piston moving in the cylinder 1 from end to end, but, when desired, the stroke length of the piston 2 can be limited.

Liquid flows by its own pressure along the pipe 8 into the valve mechanism 5 and further, under pressure, along the pipe 6 into the cylinder 1. The liquid pressure moves the piston 2 to the opposite end of the cylinder 1, whereby the liquid ahead of the piston 2 is pushed along the pipe 7 into the valve mechanism 5 and further along the discharge pipe 9 to the liquid feeding point. When the piston 2 reaches the end of the cylinder 1, the flow stops. The piston waits at the end of the cylinder until a predetermined time has elapsed from the previous start of the piston, and the time relay 10 gives a signal for a new movement. At this time the valve mechanism 5 selects, with the aid of the signals from the switches 4 in the ends 3 of the cylinder, the position in which the liquid flows by its own pressure from the inlet pipe 8 along the pipe 7 into the cylinder 1. The piston 2 pushes ahead of it liquid into the pipe 6. At this stage of the operation the valve mechanism 5 directs the liquid from the pipe 6 along the pipe 9 to the feeding point of the liquid. The time relay 10 determines the time interval between the starting times of the strokes of the piston 2, i.e. the number of strokes per time unit, and thereby the liquid volume flow per time unit. If, at the time of a signal from the time relay a signal has not been received by means of switches 4 at the ends of the cylinder that the piston has moved to the opposite end of the cylinder after the previous signal, the time relay 10 gives an error signal.

Figure 2:
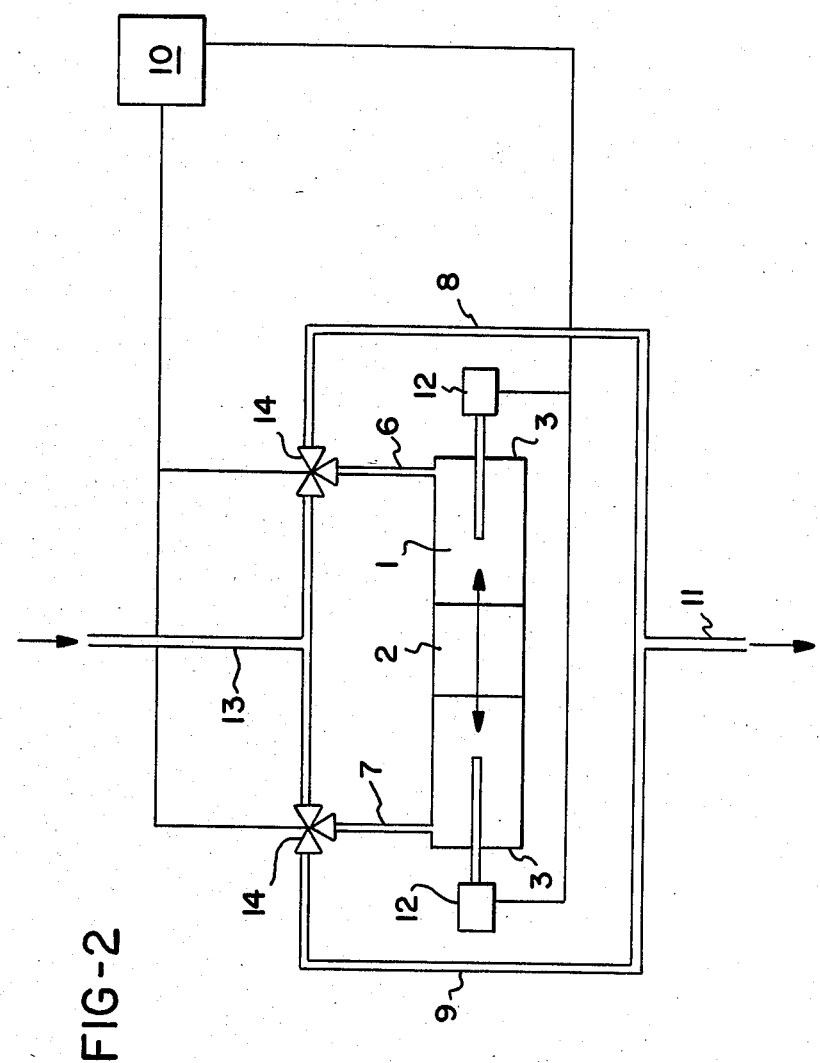
FIG. 2 illustrates a cross sectional side elevation of an alternative embodiment of the invention.

The device shown in FIG. 2 differs from the device shown in FIG. 1 in that two three-way valves 14 are used instead of one common four-way valve 5. In this case the liquid or slurry flowing under pressure in the feed pipe 13 flows through one of the three-way valves 14 into pipe 6 or 7 and further into the cylinder 1 to one side of the piston 2 in it. At this time, the other valve 14, which is closed to the liquid or slurry flowing in the feed pipe 13 is in such a position that the liquid or slurry on the opposite side of the piston 2 in the cylinder 1 can flow along the pipe 9 or 8 into the discharge pipe 11.

In the embodiment depicted in FIG. 2, mechanical switches 12 are used instead of inductive switches; their length is preferably adjustable, and on the basis of the data given by them the time relay or data center 10 closes and opens the three-way valves 14.

It is evident that it is possible to use four one-way valves instead of two three-way valves. It is also evident that the movement of the piston 2 moving in the cylinder 1 can be used for driving the valve mechanism by means of mechanical switches fitted at both ends of the cylinder. In such a case, no external source of energy is required for driving the device according to the invention, and the device is operated solely by means of the pressure of the liquid or slurry.

What is claimed is:

1. An improved device for pumping fluid in measured doses of the type having a cylinder, a piston located within said cylinder for reciprocating movement therein, pipe means connected to opposite ends of said cylinder alternately for feeding fluid under pressure into said cylinder to displace said piston and for discharging fluid from said cylinder in response to displacement of said piston by fluid pressure on an opposite side thereof, valve means connected to said pipe means for alternately directing fluid under pressure through said pipe means to a first end of said cylinder and discharging fluid from a second end, and directing fluid under pressure to said second end and discharging fluid from said first end thereof, thereby controlling a direction of travel of said piston in said cylinder, and switch means fitted at said cylinder ends for sensing a predetermined location of said piston relative to said cylinder ends and generating a signal in response thereto, the improvement comprising:

control means for actuating said valve means to reverse a flow of pressurized fluid to and a discharge of fluid from said cylinder ends at predetermined, uniform time intervals and in response to said signal from said switch means, whereby the frequency of strokes of said piston within said cylinder, and consequently a volume flow rate of fluid discharged from said cylinder, is substantially constant, regardless of variations in fluid pressure or viscosity.

2. The device of claim 1, wherein simultaneously with the starting of the piston movement, the state of action of the valve means is determined by means of signals from the switches and the control unit.

3. The device of claim 1, in which the control unit gives an error signal if the piston has not moved from one end of the cylinder to the other within the predetermined time interval.

* * * * *